United States Patent [19]

Chang

[11] Patent Number: 5,478,865
[45] Date of Patent: Dec. 26, 1995

[54] METHOD OF RECYCLING A DISCARDED POLYURETHANE FOAM ARTICLE

[76] Inventor: Ching-Bing Chang, No. 10-3, Changshu, Changshu Village, Tanglo Shiang, Miao Li Hsien, Taiwan

[21] Appl. No.: 426,664

[22] Filed: Apr. 21, 1995

[51] Int. Cl.⁶ ..................... C08J 11/04
[52] U.S. Cl. ............ 521/49; 428/262; 428/423.1; 428/903.3; 428/904; 525/424; 525/440; 521/102
[58] Field of Search ............ 521/49, 102; 525/424, 525/440; 428/262, 423.1, 903.3, 904

[56] References Cited

U.S. PATENT DOCUMENTS

| | | | |
|---|---|---|---|
| 4,439,546 | 3/1984 | Brennan | 521/49 |
| 4,451,583 | 5/1984 | Chesler | 521/49 |
| 5,185,380 | 2/1993 | Diesill et al. | 521/49 |
| 5,288,760 | 2/1984 | Morgan | 521/49 |

*Primary Examiner*—Morton Foelak
*Attorney, Agent, or Firm*—Browdy and Neimark

[57] ABSTRACT

A method of recycling discarded PU foam articles comprises a first step of grinding the discarded PU foam articles into fine particles, which are then mixed with a predetermined amount of a powdered plastic to form a mixture. The mixture is heated to become a molten mixture, which is cooled to take form. The molten mixture may be adhered to the surface of a cloth or leather material when the cooling and the forming processes of the molten mixture are under way. The final product can be burned at a high temperature to produce a high-carbon residue, which is added to the mixture to make a product having a deodorant and an antistatic effects.

9 Claims, 1 Drawing Sheet

METHOD OF RECYCLING A DISCARDED POLYURETHANE FOAM ARTICLE

FIELD OF THE INVENTION

The present invention relates generally to a method of recycling a polyurethane foam article, and more particularly to a method of recycling a polyurethane foam article having a cloth or leather attached thereto.

BACKGROUND OF THE INVENTION

The polyurethane (abbreviated as PU) foam objects are widely used in the footwear industry such that they have a cloth or leather attached thereto for one reason or another. This is particularly true with the PU foam objects which are used to make shoe pads. The used shoe pads are generally disposed of as garbages and are therefore responsible for the pollution of our environment.

SUMMARY OF THE INVENTION

It is therefore the primary objective of the present invention to provide a method of recycling a PU foam object. The product of the recycling method can be used as a raw material for making a new PU foam article.

It is another objective of the present invention to provide a method by which a used PU foam article is recycled to become a product. The residue of the product which is burned at a high temperature can be used as a raw material for making a new PU foam article having a deodorant and an antistatic effects.

In keeping with the principle of the present invention, the foregoing objectives of the present invention are attained by a method of recycling a PU foam article, which comprises a first step of grinding the used PU foam articles into a primary material, which is then mixed with an appropriate amount of a powdered plastic. The mixture of the primary material and the powdered plastic is heated and stirred thoroughly before the molten mixture is cooled to take form. In addition, the molten mixture can be adhered to the surface of a cloth or leather when the cooling and the forming processes of the molten mixture are under way. The product that is made of the molten mixture can be burned at a high temperature to produce a high-carbon residue, which is added to the mixture of the foregoing primary matetial and the powdered plastic to make a new product having a deodorant and an antistatic effects.

DETAILED DESCRIPTION OF THE INVENTION

Figure 1:
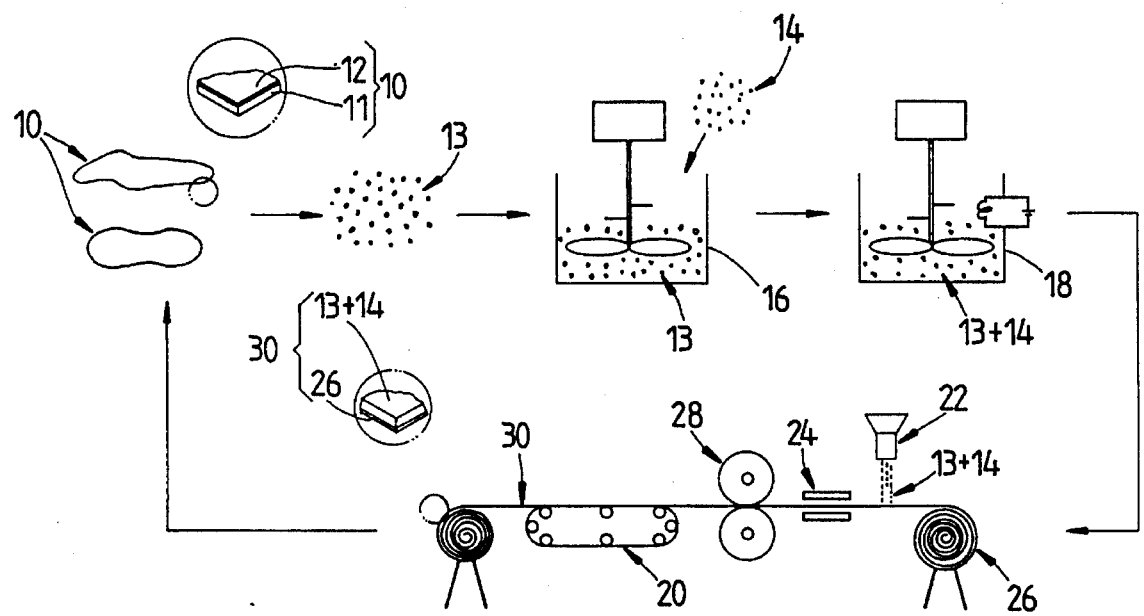
FIG. 1 shows a schematic process flow of a first preferred embodiment of the present invention.

As shown in FIG. 1, a recycling method of a PU foam article of the first preferred embodiment of the present invention comprises a step in which a predetermined amount of a used PU foam article 10 having a thin layer of a PU foam material 11 and a layer of cloth or leather 12 is frozen at a temperature below 40 degrees in Celsius. Thereafter, the frozen PU foam article 10 is crushed by grinding or tearing into fine particles 13 having a diameter smaller than 3 mm, preferably between 0.01 mm and 0.5 mm. The fine particles 13 are mixed thoroughly with a predetermined amount of a powdered plastic 14 in a first container 16. The mixture contains the PU foam material 11, the cloth or leather 12, and the powdered plastic 14 in the ratio of 8:1:1. The plastic 14 is meltable and is composed mainly of polyamide, polyester, or copolymer of ethylene vinyl acetate (EVA) and polyamide or polyester. The powdered plastic 14 has a diameter ranging between 30 and 80 microns.

The mixture is then transferred to a second container 18 in which the mixture is stirred continuously while the second container 18 is heated at a temperature ranging between 160 and 180 degrees in Celsius. The molten plastic 14 is adhered to the surface of the fine particles 13, which is then spread through a gauge 22 on the surface of an adhering material roll 26 in motion. The thickness of the fine particles 13 on the surface of the adhering material roll 26 can be adjusted by a thickness adjusting device 24 before the adhering material roll 26 is moved through a pressing machine 28 comprising a cooling device (not shown in the drawing) and two rollers. The adhering material roll 26 is moved forward by means of a conveyer 20. The adhering material 26 may be similar in nature to the afore-mentioned cloth or leather 12. As the adhering material roll 26 is moved through the pressing machine 28, a freshly recycled PU foam object 30 is formed.

Figure 2:
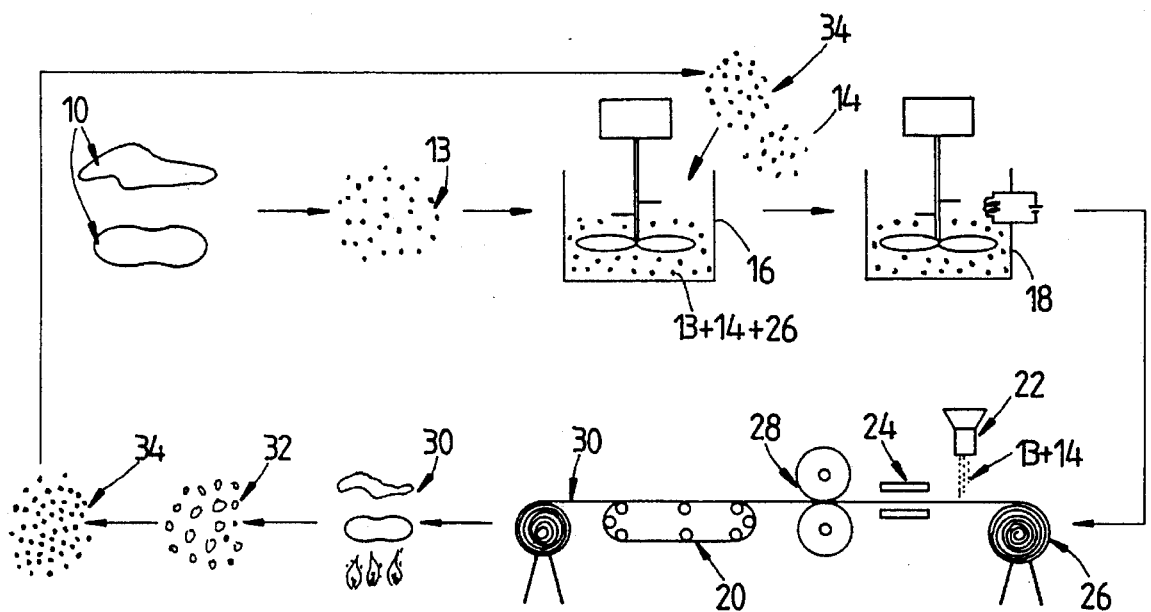
FIG. 2 shows a schematic process flow of a second preferred embodiment of the present invention.

The second preferred embodiment of the present invention is illustrated in FIG. 2 and is different from the first preferred embodiment of the present invention in that the former comprises a mixture containing the PU foam material 11, the cloth or leather 12, and the powdered plastic 14 in the ratio of 8:2:2.5, and that the former produces a finished product having a hardness of 70 in constrast with a hardness of 50 of the finished product of the first preferred embodiment of the present invention.

If the finished product of the second preferred embodiment of the present invention has a hardness in excess of 70, the finished product 30 may be burned at a temperature higher than 800 degrees in Celsius to produce a high-carbon residue 32, which is then crushed into a powder 34 by grinding. The powder 34 may be added to the mixtures of the methods of the first and the second preferred embodiments of the present invention for making the finished products 30 having a deodorant and an antistatic effects. In order to prevent the finished products 30 from having an excessive hardness, it is suggested that the amount of the powder 34 added to the mixtures should not be in excess of 10% by weight in relation to the total weight of the mixtures.

It is therefore readily apparent that the present invention has inherent advantages, which are expounded explicitly hereinafter.

The method of the present invention is capable of recycling completely a discarded PU foam article which may exist independently or in combination with a cloth or leather.

The present invention provides a method in which a recyclable high-carbon residue having a high purity is produced.

The method of the present invention makes use of a meltable plastic as an adhering agent, instead of polyol or isocyanate which is hazardous to health.

The finished product of the method of the present invention is adhered directly to a cloth or leather during the recycling process. As a result, the method of the present invention is relatively cost-effective.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A method of recycling a discarded polyurethane foam article comprising the steps of:
    (a) grinding a predetermined amount of discarded polyurethane (PU) foam articles into fine particles having a diameter smaller than 3 mm;
    (b) making a mixture containing said fine particles and a predetermeined amount of a meltable plastic powder containing polyamide or polyester;
    (c) heating said mixture at a temperature capable of causing said mixture to become molten mixture; and
    (d) transferring said molten mixture through a gauge, a thickness adjusting means, a cooling device, and a conveyer, so as to form a final product.

2. The method as defined in claim 1, wherein said discarded PU foam articles contain a predetermined proportion of a cloth or leather; and wherein said fine particles have a diameter ranging between 0.01 and 0.5 mm.

3. The method as defined in claim 2, wherein said fine particles are formed at a temperature of 40 degrees below zero in Celsius.

4. The method as defined in claim 1, wherein said meltable plastic powder has a diameter ranging between 30 and 80 microns.

5. The method as defined in claim 1, wherein said mixture contains said fine particles, said cloth or leather, and said meltable plastic powder in the ratio ranging between 8:1:1 and 8:2:2.5.

6. The method as defined in claim 1, wherein said mixture is heated at a temperature ranging between 160 and 180 degrees in Celsius for five to ten minutes.

7. The method as defined in claim 1, wherein said molten mixture is spread on a piece of cloth or leather before said molten mixture is cooled to take form.

8. The method as defined in claim 1, wherein said mixture contains no more than 10% by weight of a carbon-containing material.

9. The method as defined in claim 8, wherein said carbon-containing material is a residue obtained in a process in which said final product burned at a predetermined temperature.

* * * * *